United States Patent

[11] 3,569,841

| [72] | Inventor | Peter L. Richman |
| | | 22 Barberry Road, Lexington, Mass. 02173 |
| [21] | Appl. No. | 743,558 |
| [22] | Filed | July 9, 1968 |
| [45] | Patented | Mar. 9, 1971 |

[54] HARMONIC-REJECTING AC-TO-DC CONVERTER
8 Claims, 4 Drawing Figs.

[52] U.S. Cl. .................................................... 328/26,
307/261, 324/119, 324/132, 328/31, 328/165
[51] Int. Cl. ............................................................ H03k 5/08,
G01r 15/10, H02b 1/24
[50] Field of Search.......................................... 324/119,
132; 323/4; 321/16, 18, 9; 328/26, 28, 31, 32, 165,
167; 307/261

[56] References Cited
UNITED STATES PATENTS

| 3,470,451 | 9/1969 | Arase .......................... | 321/18 |
| 3,310,726 | 3/1967 | James .......................... | 328/26X |

Primary Examiner—Rudolph V. Rolinec
Assistant Examiner—Ernest F. Karlsen
Attorney—Robert J. Schiller ABSTRACT: An AC-DC conversion system which reduces sensitivity of the conversion to selected harmonics of the input AC wave. The absolute value signal is formed of the input AC wave and compared with a DC level which is the output of the system to provide gating signals. The latter are used to time-gate the absoluted AC signal through an averaging device.

The time-gating is explicit, gating signals being generated whenever the absolute value of the input potential exceeds a fraction of the output DC.

INVENTOR
Peter L. Richman

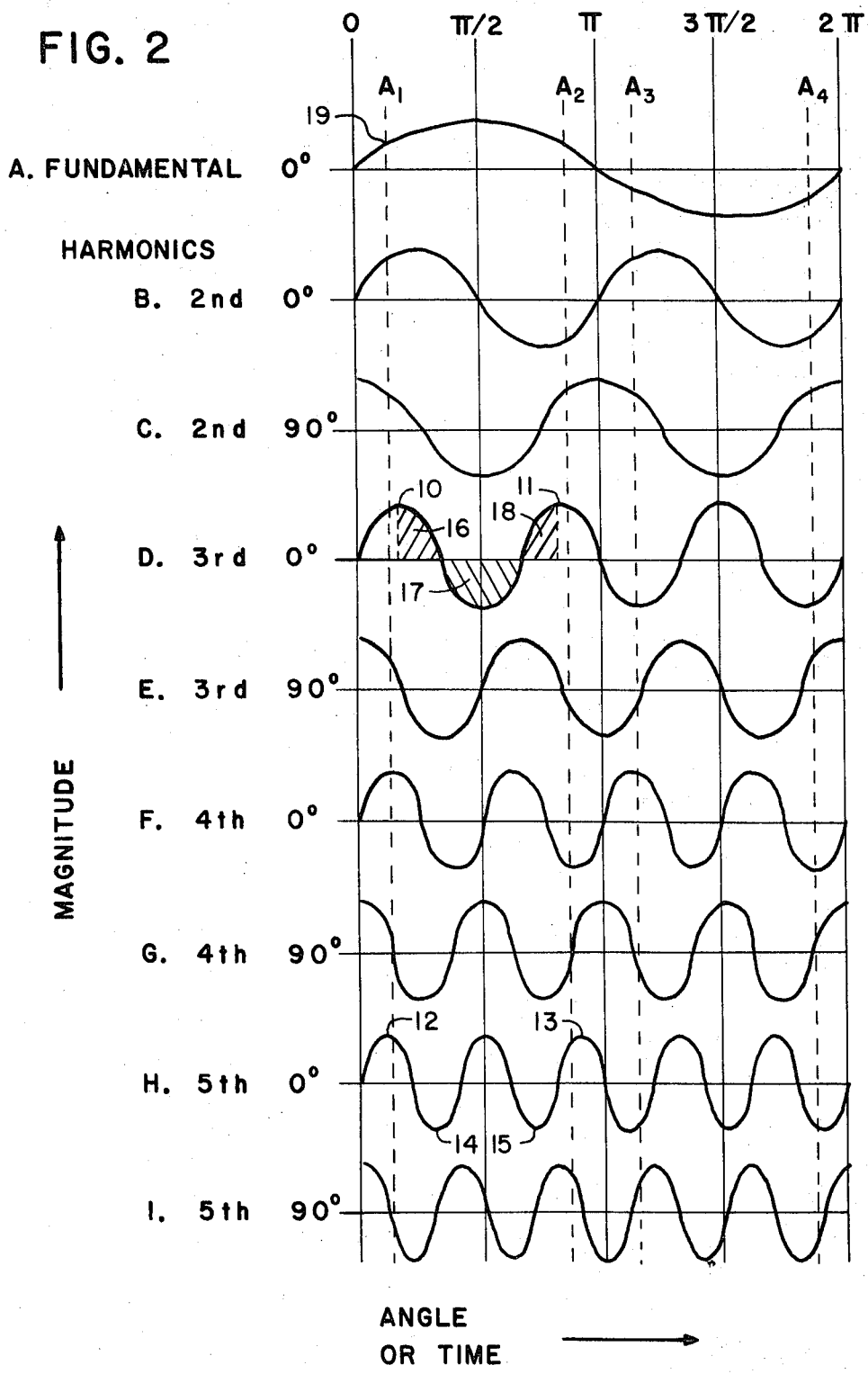

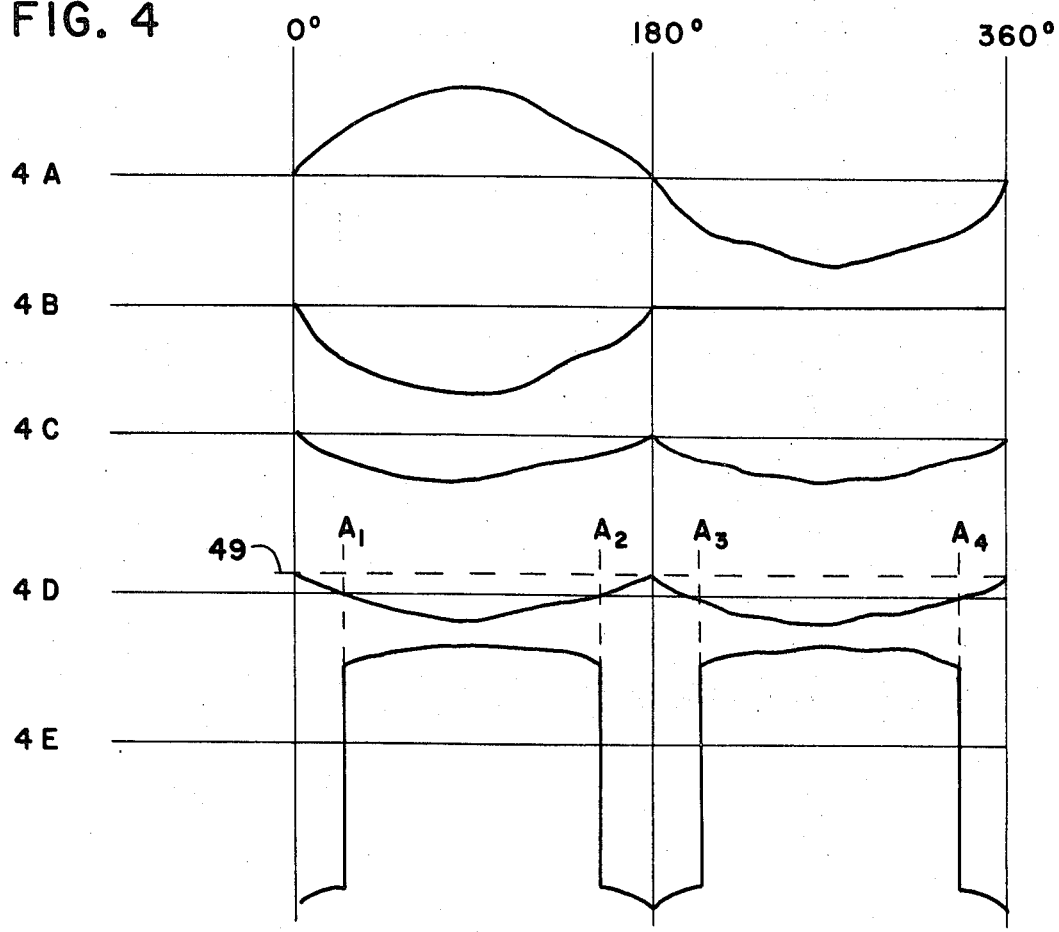

HARMONIC-REJECTING AC-TO-DC CONVERTER

The gate is set to occur either to completely eliminate a single, 0° odd harmonic component effect on the output DC or else to compromise between settings required to separately eliminate two or more such 0° odd harmonic component effects. When set to eliminate 0° third harmonic, for example, the gates are set to occur between 30 and 150°, and between 210 and 330° with respect to the fundamental component of the input wave. When set to eliminate fifth, they are set to occur between 18 and 162°, and between 198 and 342°. When set to provide equal elimination or rejection for both third and fifth 0° harmonics, they are set to occur between 24.1 and 155.9°, and between 204.1 and 335.9°, and the rejection for both is approximately 9:1 for this case.

This invention relates generally to a system for converting the magnitude of a time-varying input signal into a proportional DC signal which can then by measured by one of many commercially available DC measuring instruments. More particularly, this invention relates to a system of the specified type, wherein the conversion is of a time-varying periodic input signal and is relatively insensitive to harmonically-related distortion frequency components which are in the input signal in addition to the basic or fundamental sinusoidal waveform component. The invention is directly applicable, in particular, to situations in which the desired DC output is to be proportional to the absolute average value of the periodic time-varying input signal, and in which the periodic, time-varying input signal exhibits two crossings of the zero voltage axis for each period of the fundamental input wave component.

Known prior-art systems which are used to convert the absolute average (typically abbreviated "average" by those working in the art) value of a time-varying periodic input signal into a DC output signal having a magnitude that is proportional to the input signal usually utilize either vacuum-tube or semiconductor diodes or rectifiers, either by themselves or within a feedback loop, to obtain the required absolute value and averaging functions. A low-pass filter is used to eliminate remaining ripple components of the original time-varying periodic input signal from the output DC signal which results from the diode-operated absoluting and averaging circuits. Such converter systems are sometimes referred to by those working in the art as Average-to-DC Converters, the absolute property of the conversion being implied, since the average value of an AC signal—on a nonabsolute basis—is zero by definition.

Such Average-to-DC Converters find application and use as signal conditioning input converters for DC digital voltmeters, differential (or potentiometric) voltmeters, multimeters and in virtually all other AC average-measuring metering instruments. In many applications the absoluting function takes the form of discarding one-half (either the portion below or that above the zero voltage axis), of the input waveform, in which case the Average-to-DC conversion is said to be half-wave in nature, since the value of only half of the waveform (the positive half or the negative half respectively) is averaged and measured via the low-pass filter and measuring means which follow. In other cases, the polarity of one half (either that lying below or that lying above the zero voltage axis) of the input time-varying periodic waveform is inverted, and added to the remaining half of the original waveform. This technique provides two half-waveforms, both of the same polarity, as inputs (either separately or combined into a single input) to the low-pass filter. In the latter case the Average-to-DC conversion is said to be full-wave in nature, since both halves of the waveform are used in the conversion.

In such prior-art Average-to-DC converter systems, high accuracies are obtainable for the Average-to-DC conversion—that is, good stability and linearity of output DC with respect to input AC—for periodic, time-varying input signals that are essentially pure sine waves, virtually uncontaminated by distortion components which are harmonically related to the basic or fundamental input sinusoidal wave. In such circumstances, the output DC from the Average-to-DC converter accurately represents the average value of the periodic, time-varying input AC. However, what is usually desired in most practical applications for such AC-to-DC converters is a measurement not of the average, but rather of the R.M.S. or root-mean-square value of the time-varying, periodic AC input wave. The R.M.S. value is generally preferred because it is highly unresponsive to harmonic contamination or distortion on the AC wave, for small to moderate amounts of distortion, while the average value is not. The R.M.S. value is a more basic measurement, for which independent AC/DC transfer standards exist at national and industrial standardizing laboratories. Thus while a prior-art Average-to-DC converter will also accurately convert the average value of a periodic wave which has harmonic contamination into a proportional DC representation for measurement by one of a number of conventional DC measuring instruments, it is the R.M.S. value or even the fundamental value (i.e. the value of the fundamental or basic waveform component alone, uncontaminated by harmonics) that is desired in most practical situations.

One way that is used to circumvent the problem in prior art systems is to use AC-to-DC converters that are inherently responsive to the R.M.S. value of the input wave, instead of to the average value. Such R.M.S. converters as they are called, are typically based on the operation of thermally sensitive devices such as thermocouples or thermistors, since the R.M.S. value of a wave is essentially a measure of its heating effect. Such devices tend to be inaccurate, slow, sensitive to overload (resulting in burnout or destruction of the thermally sensitive element), and unstable both with time and with ambient temperature changes.

Another way that is used to circumvent the problem of Average-to-DC converter harmonic sensitivity in the prior art is to precede the converter by a band-pass filter, tuned to the fundamental of the input wave. Thus, an output DC proportional to the average value of the fundamental wave component of the input AC is obtained at the output of the Average-to-DC converter, since the converter's input is only that wave which passes through the tuned filter, namely the basic of fundamental component of the input A.C. This approach, however, has major disadvantages which severely limit its application. First, the filter restricts operation to a single input frequency or narrow band of frequencies, and must be changed for each new input frequency. Often, too, the input frequency cannot even be predicted with high accuracy, as in general purpose industrial applications. In addition, filter insertion loss tends to be unstable both with time and with changes in ambient temperature, making it difficult to obtain and maintain high accuracies in such a system in a practical implementation.

The present invention therefore has as a principal object, the provision of a high-precision AC-to-DC conversion device adapted to provide a DC output which exhibits a high degree of rejection for input wave components which are harmonically related to the fundamental input wave component.

Another principal object of the present invention is to provide a device of the type described for providing an output which is particularly insensitive to input wave components odd-harmonically related to, and in a basically in-phase relationship with, the fundamental input wave component, the conversion being accomplished without eliminating the ordinary insensitivity of a converter to out-of-phase odd harmonics and all even harmonics.

Another object of the present invention is to provide a device of the type described which yields a DC output related to the average value of the fundamental frequency component of the input waveform, in a manner that is highly insensitive to harmonic contamination on the input wave.

Yet another object of the present invention is to provide a device of the type described characterized by its capability for general use, ranging from application in simple ¼ percent to 1 percent analogue and digital multimeters to high-precision application as 0.01 percent to 0.1 percent AC-to-DC converter signal conditioners for digital and differential (potentiometric) voltmeters, with possibility of extension to use in 5 and 10 part-per-million precision AC-to-DC conversion equipment used in monitoring precision AC signals such as those used to drive the various inputs to low-drift gyroscopes employed in navigational systems.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims. For a fuller understanding of the nature and objects of the present invention, reference should be had to the following detailed description taken in connection with the accompanying drawings wherein:

FIG. 2 is a graphical representation showing an exemplary input fundamental wave component with exemplary harmonic contamination wave components;

FIG. 4 is a graphical representation of exemplary waveforms of the circuit of FIG. 3;

Broadly described, the present invention is a device for generating, from a time-varying, periodic composite AC input signal consisting of a fundamental wave and related harmonic components, a DC output signal proportional to the absolute full-wave average value of the fundamental input signal, by averaging only those portions of the input signal lying between angles explicitly selected with respect to the fundamental in order to minimize the effect on the output DC of a single in-phase or 180° out-of-phase odd harmonic, or explicitly set to a compromise value with respect to two or more in-phase or 180° out-of-phase odd harmonics.

Figure 1:
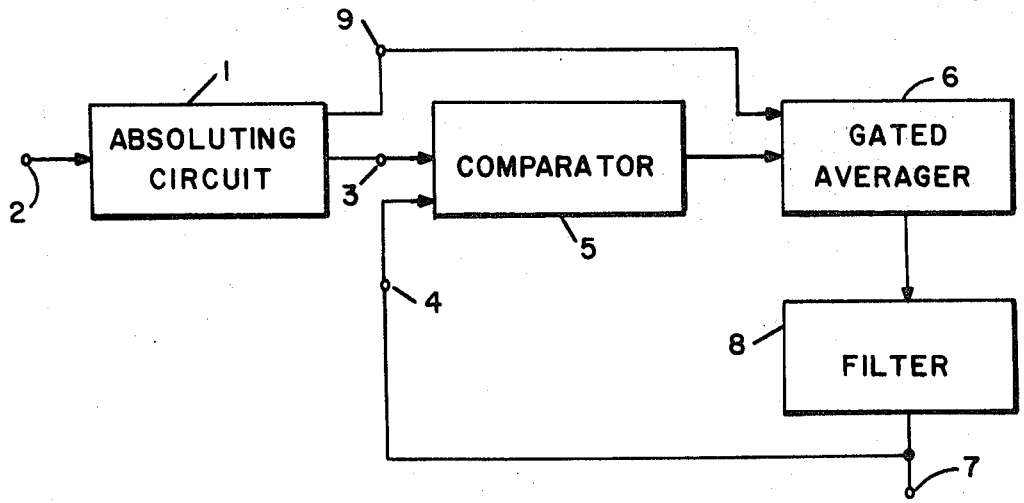
FIG. 1 is a block diagram illustrating one general form of the present invention.

Referring now to FIG. 1 which contains a block diagram of the general form of a harmonic-rejecting converter of the present invention, there is provided Absoluting Circuit means 1, adapted to accept a time-varying, periodic input signal applied to system input terminal 2, and to furnish outputs at terminals 3 and 9 proportional to opposite polarities of the absolute instantaneous value of the input signal. Means such as comparator 5 are provided for comparing the time-varying signal appearing on terminal 3 with the DC output signal from the total harmonic-rejecting converter appearing at system output terminal 7. The output of Comparator 5 is a train of gate signals for enabling the following Gated Averager 6 whenever the signal at terminal 3 exceeds the DC output at terminal 7 in magnitude. The Gated Averager averages the output from terminal 9 during the time interval that it is enabled by the Comparator 5. Filter 8, following the Gated Averager 6, serves to eliminate AC from the pulsating DC wave furnished as the output of Gated Averager 6. In turn, Filter 8 provides to output terminal 7 a DC potential that is proportional to the full-wave absolute average value of the input to terminal 2. The value of this absolute average is relatively insensitive to the harmonic content of the input signal, in view of the gating of the input wave as will be described.

Referring now to FIG. 2, there will be seen a graphical representation of an input fundamental in-phase or 0° wave, with exemplary second, third, fourth and fifth harmonic wave components. All of the second through fifth harmonic components are shown both in their sine or 0°, and cosine or 90° phase shifts with respect to the fundamental.

Throughout the entire discussion which follows, it is assumed that any statements that hold true in general for 0° waves or for 90° waves, hold true with equal validity for 180° and 270° waves respectively.

As is well known to those skilled in the art, Fourier analysis shows that a sine wave of any phase shift may be synthesized by adding two other sine waves of the same frequency and appropriate amplitude, one of the added waves to be at either 0 or 180° phase shift, the other wave at either 90 or 270° phase shift. For this reason it is sufficient in consideration of the effects of harmonics on a computation such as an average computation, to be concerned merely with a sine (the 0 or 180° phase shift wave) and cosine (the 90 or 270° phase-shift wave) at each harmonic, to be able completely to characterize the effects of the harmonics on the computation. Since there is no functional difference between 0° and 180° waves, and between 90° and 270° waves, it is sufficient merely to consider 0° and 90° waves to be able completely to characterize the effects of the harmonics on the AC-to-DC conversion.

FIG. 2A shows 0° phase fundamental, for reference purposes; FIGS. 2B and 2C show 0 and 90° phases respectively for the second harmonic; FIGS. 2D and 2E show 0 and 90° phases respectively of the third harmonic; FIGS. 2F and 2G show 0 and 90° phases respectively of the fourth harmonic; while FIGS. 2H and 2I show 0 and 90° phases respectively of the fifth harmonic. While additional harmonics, of still higher order, may exist in the input signal in the general case, performance of the present invention with respect to them may be readily inferred from that associated with the first four (second through fifth) depicted in FIG. 2.

The relative magnitudes of the fundamental and its harmonics in FIGS. 2A through 2I are not meant to be representative of an actual situation for which the instant invention is intended to perform. Rather, the invention is of primary interest and is mainly applicable when the magnitudes of the various harmonics with respect to the fundamental signal are sufficiently small that the addition of the harmonics to the fundamental to compose the total, composite input signal, leaves the number of zero axis crossings unchanged, i.e. there remain but two axis crossings per fundamental cycle for the composite wave. This restriction however does little to diminish the usefulness of the instant invention since it implies merely that the harmonic magnitudes be less than 10 or 20 percent of the fundamental, and situations in which a precision, harmonic-rejecting average-to-DC conversion are generally desired in industry are restricted to input waves whose total harmonic content is typically less than 5 percent. To show such small waves in FIGS. 2B through 2I however, would make analysis difficult; hence they are arbitrarily shown for analytic purposes as roughly the same magnitude as the fundamental signal in FIG. 2A.

Evidently if an in-phase of 0° even harmonic such as the second or fourth (FIGS. 2B or 2F) be added (in small or moderate amount as hereinbefore mentioned) to an in-phase fundamental such as shown in FIG. 2A, the net effect of the harmonic on the average value of the composite or total signal resulting from said addition will be zero. This follows from the fact that within each half-cycle of the 0° fundamental shown in FIG. 2A, there are two equal and opposite polarity half-cycles of the 0° second harmonic shown in FIG. 2B, and two sets of two equal and opposite polarity half-cycles of the 0° fourth harmonic shown in FIG. 2F, and so on by inference for all higher order, 0° or in-phase even harmonics.

The same situation is essentially true as well for the 90° even harmonics, specifically for the 90° second harmonic shown in FIG. 2C and the 90° fourth harmonic shown in FIG. 2G. However, for the 90° cases, since the values of the harmonics are not zero at the axis crossing points of the fundamental of FIG. 2A, they cause a small, neglectable error on the average value of a composite waveform made up of a fundamental and a series of 90° even harmonics. The magnitude of the effect is 0.005 percent for 1 percent harmonic, 0.125 percent for 5 percent harmonic content, compared with significantly higher errors (0.33 percent and 1.67 percent respectively for the two examples given) for 0°, third harmonic contamination, for example. Thus for practical purposes, a conventional average-to-DC conversion may be said to be virtually insensitive to all even harmonic contamination in small to moderate amounts—e.g., up to 5 percent, say, in any event. (These considerations extended to cases of very large harmonic contamination as well in which there are more than two axis crossings of the composite wave during a fundamental period, are covered in the paper "R.M.S. Measurement of AC Voltages," by F.C. Martin, in the publication *Instruments and Contrb Systems*, Jan. 1962.)

With regard to 90° odd harmonics such as the third of FIG. 2E or the fifth of FIG. 2I, the situation is the same as for 0° even harmonics, namely there is zero effect on the average of the composite made up of fundamental and 90° harmonic, even though as with the 90° even harmonics the value of the 90° odd harmonics is nonzero at the points at which the axis crossings of the 0° fundamental occur. The values of the 90° odd harmonic are equal and opposite at the beginning and end of each fundamental half-cycle, so that the second-order effects which occur with the 90° even harmonics exactly cancel in the case of the 90° odd harmonics, and there is zero effect on the average for this case.

Thus the effect on average value of all harmonics save the 0° odd harmonics is either zero or neglectable. As can be seen from FIG. 2D, during the first half-cycle of the 0° fundamental, there are three half-cycles of the 0° third harmonic; and while the first two cancel since they are opposite in polarity, the third introduces a change into a composite signal comprising the 0° fundamental and the 0° third harmonic. It is in fact a positive change for the situation shown as exemplary in FIGS. 2A and 2D, since the one-half cycle that is left over is positive going. Thus the average value of the composite signal will be greater for the situation shown in FIGS. 2A and 2D. If the phase of the FIG. 2D signal were taken instead as 180°, the residual one-half cycle of the third harmonic would become negative, and the value of the composite average decreased as a consequence. An analogous situation obtains for the second half of the fundamental, so that the net effect is the same whether half-wave or full-wave averaging is employed. Similar errors exist for the 0° fifth and order odd harmonics.

Specifically, the average value $E_{AV}$ of a composite wave made up of the fundamental and the $n^{th}$ harmonic at 0° phase shift with respect to the fundamental, for $n$ odd, wherein the peak amplitude of said fundamental is $e_1$ and the peak amplitude of the said $n^{th}$ harmonic is $e_n$, is given by:

$$E_{Av} = \frac{1}{\pi} \int_0^\pi (e_1 \sin A + e_n \sin nA) \, dA \quad (1)$$

where A is the running variable of integration—angle in this case. Equation (1) is merely a statement of the definition of the average, namely the integral over a given period ($\pi$ in this case) divided by the period. Integrating and reducing equation (1) yields $$E_{AV} = \frac{2}{\pi} e_1 + \frac{2}{\pi} \frac{e_n}{n} \quad (2)$$

The fractional effect, $d_n$, of the $n^{th}$ harmonic (odd) on the conventional average value $E_{AV}$ is the ratio of the $e_n$ term to the $e_1$ term in equation (2), or $$d_n = \frac{1}{n}(e_n/e_1) \quad (3)$$

Thus the effect of a 0°, $n^{th}$, odd harmonic on the conventional average value of a composite wave made up of the fundamental and that harmonic, is $1/n$ times the relative amplitudes of the harmonic and the fundamental; in other words, 5 percent third harmonic yields 5/3 percent on the average, and so forth. The result is identical whether one-half or the full wave be considered. For a fuller discussion of the effects of harmonics on the conventional average value of a composite wave containing them, including the case in which there are more than two zero-axis crossings in a cycle, see "R.M.S. Measurement of AC Voltages," by F.C. Martin, supra.

The embodiment of FIG. 1 operates by carrying out the averaging process not over the entire half-cycle from 0 to 180° of the fundamental component, but only from 30 to 150°, for example, in the situation in which 0° third harmonic is to be eliminated as a factor influencing the AC converter's DC output. With reference again to FIG. 2, specifically FIG. 2D showing the 0° third harmonic, it can be seen that if an average is taken between the two positive peaks 10 and 11 (an area comprising positive quarter-cycles 16 and 18 and negative half-cycle 17) the average value of the 0° third harmonic so taken over this interval will be zero, the areas of the positive quarter-cycles 16 and 18 just cancelling the area of the negative half-cycle 17. Thus the average value of the fundamental of FIG. 2A with the 0° third harmonic superimposed, will be unresponsive to 0° third harmonic if the average of the composite signal is taken between the angles 30 and 150°, or between the positive peaks of the 0° third harmonic designated 10 and 11 in FIG. 2D.

In an analogous manner, if the average be taken between either the two negative peaks 14 and 15 in FIG. 2H showing the 0° fifth harmonic, or between the two positive peaks 12 and 13 of that same harmonic as shown, the average so taken will in either case reflect zero influence for the fifth harmonic of 0° phase, since the net area between the negative peaks 14 and 15 at 54 and 126° respectively, or between positive peaks 12 and 13 at 18 and 162° respectively, of the fifth harmonic at 0° phase, is zero.

The embodiment of FIG. 1 performs the selection of the angles at which the full-wave rectified or absoluted input signal is to be gated for averaging purposes, by comparing the absolute value of the instantaneous input signal on terminal 3 with DC output from the entire harmonic-rejecting AC converter on terminal 7, and generating a gate whenever the magnitude of the input signal exceeds the magnitude of the DC output which is used as a comparison level. In effect, the Comparator determines the desired angles between which the average taken will result in harmonic rejection all in accordance with the detection of the axis crossings of the absolute value of the input wave with respect to an axis determined by a comparison level DC. The comparison level is relatively invariant with harmonic contamination, being derived as it is from the output of the harmonic-rejecting AC converter.

Since the comparison level is derived, in the embodiment of FIG. 1, from the output of the harmonic-rejecting converter, a feedback loop exists from terminal 7, back to terminal 4, and via the Comparator 5, Gated Averager 6 and Filter 8, to output terminal 7 again.

In general, it may be desirable to select angles for the gating which are a compromise between those that give perfect rejection for any single 0° odd harmonic component, and those that give perfect rejection for one or more other 0° odd harmonic components. Specifically, since the effects of third and fifth harmonics predominate in a conventional average-to-DC conversion, and since they are most common in general industrial measurement situations, it is most often these two components for which an implementation will normally be designed to compromise. The relative degree of rejection for each may be established for specific situations, as a function of the location of the selected gating level, or the angles between which the averaging process is carried out.

Specifically with reference again to FIG. 2, there are shown the two angles $A_1$ and $A_2$, where $A_1$ is taken to fall between the positive peak 12 of the 0° fifth harmonic of FIG. 2H, and the positive peak 10 of the 0° third harmonic of FIG. 2D; and where $A_2$ is taken, in a symmetrical manner, to fall between the positive peak 13 of the 0° fifth harmonic of FIG. 2H and the positive peak 11 of the 0° third harmonic of FIG. 2D. Thus an average taken between the angles $A_1$ and $A_2$ will display a rejection for 0° third and 0° fifth harmonic components which will not be complete, but which may be substantially greater than the rejection for each of said harmonic components in a conventional average-to-DC conversion.

From FIG. 2D, the error in the third harmonic rejection will be positive in the first half-cycle of the fundamental as shown, since $A_1$ lies to the left of the positive peak 10 at 30°, and $A_2$ lies to the right of the positive peak 11 at 150°; so that between $A_1$ and $A_2$ there are two small, equal positive areas ($A_1$ to peak 10, and peak 11 to $A_2$), in excess of the zero area that results from averaging wave portions 16, 17 and 18 as hereinbefore described. The contributions of these two areas to the average value of an input signal which is a composite of a fundamental plus a 0° third harmonic will be the areas divided by the period over which the average is being taken for the full wave, in this case 180° Designating the error due to these two small positive areas as $E_3$, and taking the peak amplitude of the third harmonic as $e_3$, the error $E_3$ may be found by integrating:

$$E_3 = \frac{2}{\pi} e_3 \int_{A_1}^{30°} \sin 3A \, dA \quad (4)$$

In a similar manner it may be seen that the error $E_5$ in the composite average due to the 0° fifth harmonic will be negative, since there is insufficient area remaining in the two extreme positive peaks; and it is due to the two equal small areas in FIG. 2H lying between the peaks 12 and 13 individually with respect to the angles $A_1$ and $A_2$ respectively. Taking the peak amplitude of the fifth harmonic as $e_5$, the error $E_5$ in the composite average is:

$$E_5 = \frac{2}{\pi} e_5 \int_{18°}^{A_1} \sin 5A \, dA \quad (5)$$

Integrating equations (4) and (5) between the indicated limits yields:

$$E_3 = \frac{2e_3}{3\pi} \cos 3A_1 \quad (6)$$

and;

$$E_5 = \frac{2e_5}{5\pi} \cos 5A_1 \quad (7)$$

$E_5$ is negative, as required, for $A_1 \geq 18°$, since $5A_1$ is then $\geq 90°$ and the cosine is negative.

Setting the absolute values of the errors due to 0° third and fifth harmonics equal to one another, i.e. making the design decision that the final average will be as insensitive to one as to the other, implies equality for the absolute values of equations (6) and (7), which reduces to:

$$\cos 3A_1 = -\frac{3}{5} \cos 5A_1 \quad (8)$$

A numerical solution for equation (8) yields a result for $A_1$ that is very nearly 24.1°, with $\cos 3A_1$ equal to 0.304 approximately.

However, in the instant invention the fundamental is averaged only between the angles $A_1$ and $A_2$, hence the average value of the fundamental so taken, $E_{AV}'$, is $$E_{AV}' = \frac{e_1}{\pi} \int_{A_1}^{A_2} \sin A \, dA \quad (9)$$

which, for $A_2 = \pi - A_1$, integrates and reduces to $$E_{AV}' = \frac{2}{\pi} e_1 \cos A_1 \quad (10)$$

Thus the ratio $d_3$ of the harmonic to fundamental components of the output DC is given by the ratio of equation (6) to equation (10) for the third harmonic, and $d_5$ is given by the ration of equation (7) to equation (10) for the fifth harmonic. Reducing, $$d_3 = \frac{1}{3} \frac{\cos 3A_1}{\cos A_1} \quad (11)$$

and $$d_5 = \frac{1}{5} \frac{\cos 5A_1}{\cos A_1} \quad (12)$$

In conjunction with equation (8), equations (11) and (12) assure that $d_3$ and $d_5$ will be equal. For $A_1 = 24.1°$, in particular, $d_3$ and $d_5$ are both 1/9, very nearly; indicating about a 3:1 improvement for third harmonic rejection (Versus $d_3 = \frac{1}{3}$ from equation (3) with $n = 3$), and 1.8:1 improvement for fifth harmonic rejection (versus $d_5 = \frac{1}{5}$, also from equation (3), with $n = 5$).

Thus the influence of 0° third harmonic and 0° fifth harmonic on the average computation of instant invention will be reduced to about 0.33 and 0.55 their values respectively for a conventional average computation, for the special case in which the harmonic-rejecting converter of instant invention is set to reject third and fifth 0° harmonics equally.

On the other hand, if the gating level is set so that $A_1$ and $A_2$ in FIG. 2 are 30 and 150° respectively, then the rejection for third harmonic will be complete, while from equation (12), the rejection for fifth harmonic at 0° will be $-(1/5)$, or the magnitude of the rejection will be unchanged from that for a conventional average, but the sign will be changed.

If the gating level is set so that $A_1$ and $A_2$ in FIG. 2 are 18 and 162° respectively, then the rejection for fifth harmonic will be complete as hereinbefore described, while from equation (11), the rejection for third harmonic at 0° will be 1/4.85; an improvement of (4.85/3) or 1.62 compared to a convention average.

Clearly any reasonable compromise may be made between the two extremes of complete rejection for either 0° third or 0° fifth, or any other 0° odd harmonics, for that matter.

The effect of averaging only a central segment—such as from $A_1$ to $A_2$ in FIG. 2—on the sensitivity of the AC-to-DC conversion to harmonic components other than 0° odd harmonics, is to leave unchanged the basic insensitivity of the conventional average conversion. This is true so long as the average value, in the instant invention, be taken for both half cycles of the fundamental, e.g. between $A_1$ and $A_2$ as hereinbefore described, plus between $A_3$ and $A_4$ in FIG. 2 as well, where $A_3$ and $A_4$ bear the same angular relationships to 180 and 360° as $A_1$ and $A_2$ bear to 0 and 180° respectively. $A_3$ and $A_4$ equal $A_1$ plus 180° and $A_2$ plus 180° respectively. The second average, taken between $A_3$ and $A_4$, is of course polarity-inverted before addition to the first average taken between $A_1$ and $A_2$.

That a full-wave rather than just a half-wave average of the peaks of the input wave is necessary in order to maintain the normal invariance hereinbefore discussed to all but 0° odd harmonics, may be seen by inspection of FIG. 2. Evidently 0° even harmonics—second and fourth for example, as in FIGS. 2B and 2F respectively—will average to zero over the angular segment $A_1$-$A_2$, as will 90° odd harmonics—as third and fifth, for example, of FIGS. 2E and 2I respectively. Ninety degree even harmonics, however, such as the second and fourth of FIGS. 2C and 2G respectively, will no longer average to zero over the angular segment $A_1$-$A_2$ for $A_1$ and $A_2$ different from 0 and 180°, respectively. The effect of second harmonic, for instance, from FIG. 2C, is to build up a net negative or decreasing effect as the positive areas between 0° and $A_1$ and $A_2$ and 180° are eliminated. However, the effect on the composite of fundamental plus 90° second in the second half of the fundamental wave, is to increase the average as the positive areas between 180° and $A_3$, and $A_4$ and 360° are eliminated (bearing in mind that the total area computation for this second half of the wave is to be polarity inverted before addition to the area of the first half of the input wave). Thus taking the full-wave rather than half-wave average of the peaks, guarantees the same immunity to effects of harmonic distortion components of 90° even harmonic character, as is enjoyed by the conventional average computation.

Figure 3:
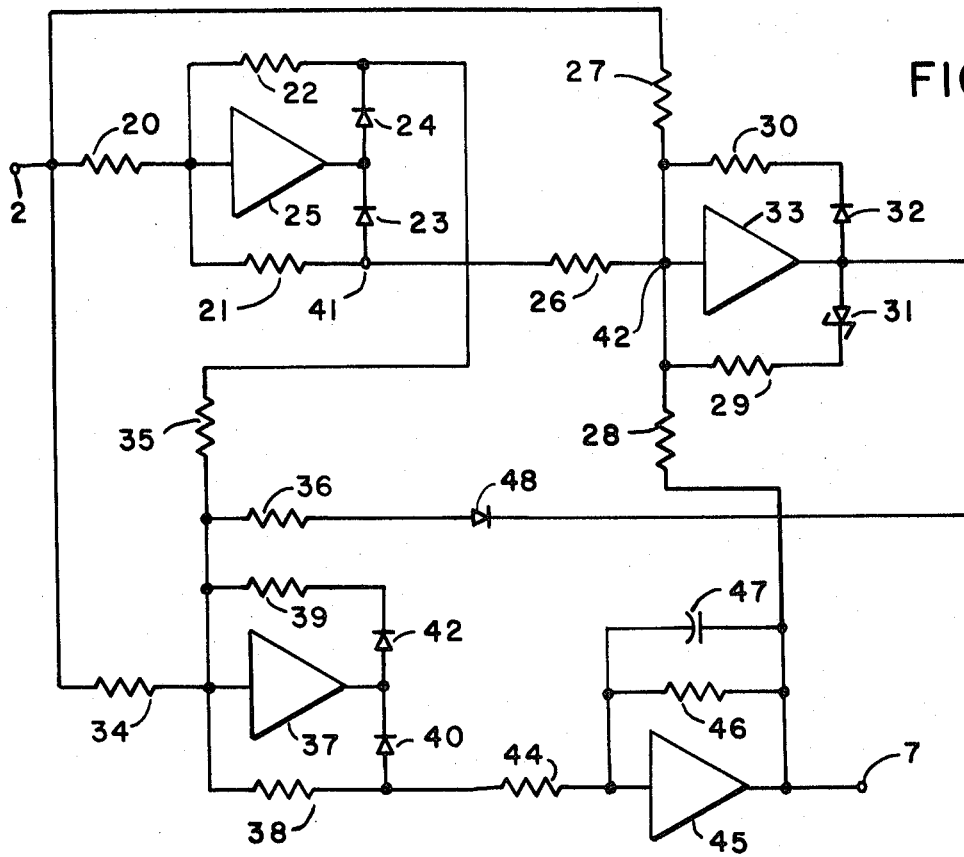
FIG. 3 is a schematic circuit diagram of one embodiment of FIG. 1 in greater detail.

Referring now to FIG. 3, there is shown a specific embodiment of he invention wherein specific computing circuits are employed to implement the block diagram of FIG. 1 in a precision harmonic-rejecting AC-to-DC converter. The input wave applied to terminal 2, containing an amount of harmonic contamination typical of industrial measurement applications such as 3 to 10 percent, supplies input resistor 20 of an operational rectifier comprising inverting amplifier 25 with feedback diodes 23 and 24 respectively in series with feedback resistors 21 and 22 in two feedback loops. This circuit is employed to perform the beforementioned absoluting function, as required by block 1 of FIG. 1. For a fuller understanding of such precision rectifiers and absoluting circuits employing operational amplifiers, see the text "Electronic Analogue and Hybrid Computers," Korn and Korn, McGraw Hill Book Company, 1964, pages 344 and 345, as well as 359 and 360.

For that portion of the output wave from amplifier 25 that is negative-going (which, because amplifier 25 exhibits negative-gain, implies that the input wave on terminal 2 is concurrently positive-going) diode 23 conducts and the feedback current around the amplifier 25 is supplied via feedback resistor 21, thereby generating at the junction to diode 23 and resistor 21 a precision replica of the input potential for the half-cycle involved.

Referring now to FIG. 4, wherein are shown exemplary waveforms for the circuit of FIG. 3, an assumed input at terminal 2 is shown in FIG. 4A. FIG. 4B shows the waveform just discussed at the junction of diode 23 and resistor 21, designated terminal 41. This waveform is of opposite polarity from the wave of FIG. 4A when the latter is positive, and is zero for negative-going input. The other feedback path including diode 24 and resistor 22 conducts during this negative-going period, providing a positive half wave.

Means are provided for summing the wave of FIG. 4B appearing at terminal 41, with the input wave from terminal 2. This is accomplished by another operational amplifier configuration comprising input resistors 26 connected to the junction of diode 23 and resistor 21, 27 connected to input terminal 2 and, high gain inverting amplifier 33. Amplifier 33 is also provided with split feedback paths comprising respectively diode 32 and resistor 30 for positive feedback potentials, and Zener diode 31 and resistor 29 for negative potentials. Since resistor 27 is set equal to twice the value of resistor 26, the current into the summing junction 42 of amplifier 33 due to the wave on the input terminal 2, FIG. 4A, will have half the effect of the current due to the inverted, half-wave rectified form of the input wave appearing at terminal 41 (FIG. 4B). If these two waves of FIGS. 4A and 4B are summed by themselves, they would therefore appear as in FIG. 4C, which is the algebraic sum of the waves of FIGS. 4A and 4B with the wave of FIG. 4A having a scale factor of ½ and the wave of FIG. 4B having a scale factor of 1, in the addition.

There is another or third input provided to the amplifier 33 through resistor 28. This input is the output DC potential of the entire harmonic-rejecting AC-to-DC converter 43 of FIG. 3, appearing on terminal 7 in that FIG. This potential is positive as will be shown, and offsets the sum of potentials on terminals 2 and 41 as shown in FIG. 4C that would otherwise occur, so that the actual sum that does occur is as shown in FIG. 4D. The height of the waveform baseline 49 above the zero-volt axis is set by the potential at terminal 7 in conjunction with the third input scaling resistor 28 to amplifier 33.

Amplifier 33 inverts the polarity of the signal shown in FIG. 4D, and splits it into two segments, that which is above the zero axis (via feedback through diode 32 and resistor 30) and that which is below the zero axis (via the second feedback path, through Zener breakdown diode 31 and resistor 29). Thus positive current in the feedback circuit of amplifier 33 flows via diode 32 and resistor 30, creating a positive potential at their junction during the first half-cycle between the angles $A_1$ and $A_2$, and during the second half-cycle between the angles $A_3$ and $A_4$. At all other times, negative current flows in the feedback circuit of amplifier 33 via Zener breakdown diode 31 and resistor 29, creating at their junction a negative potential. However, in switching from negative feedback current to positive feedback current and vice versa, the amplifier 33 must jump through or traverse the gap created by the forward conduction potential of diode 32 plus the Zener breakdown potential of diode 31. As shown, FIG. 4E represents the output potential of amplifier 33 at its output terminal which drives and is connected to both of the diodes 31 and 32. This traversing of the diode gaps provides a highly sensitive indication of the points at which the wave of FIG. 4D passes through zero, or the points at which the wave of FIG. 4C equals the selected potential fed back from the output terminal 7 via resistor 28 to the input of amplifier 33 for comparison purposes. Thus the wave of FIG. 4E provides the required gate signals, and amplifier 33 with its associated input and feedback networks provides the required performance of the comparator of FIG. 1, shown as block 5 therein.

The gate signal output of amplifier 33, shown in FIG. 4E, may thus be used to gate that portion of the opposite polarity from the absoluting circuit composed of amplifier 25 and its associated input and feedback networks as hereinbefore described. The specific implementation of such a gate might take the form of a transistor or field-effect transistor switch, or for highest precision, may be implemented via operational amplifier techniques as are the other computing functions already described for the embodiment of FIG. 3. The specific gate shown, with amplifier 37 and its associated input and feedback networks, is described in greater detail in the publication, "Applications Manual for Computing Amplifiers," published by Philbrick Researches, Inc., Dedham, Massachusetts; in FIG. 2.39 and associated descriptive material contained therein. (Library of Congress Catalogue Card Number 66-19610).

Inputs to the specific precision gate embodiment of FIG. 3 are applied via resistor 35 connected to the junctions of diode 2Y and resistor 22, and resistor 34 connected to input terminal 2. By themselves, these inputs would result in a full-wave, positive-going current sum in a manner analogous to that in which the signals through resistors 26 and 27 would, by themselves, result in a full-wave, negative-going current sum of FIG. 4C as hereinbefore described. In fact, the current sum in resistors 35 and 34 would be identical in form with that of FIG. 4C, except being of the opposite polarity.

The output gate signal from amplifier 33 is also applied, via resistor 36 in series with diode 48, to the input summing junction of amplifier 37. Diode 48 is poled so as to pass only the negative-going portion of the wave of FIG. 4E, acting to prevent current flow during the positive portion of the wave. Thus during the positive-going portion of the gate signal from amplifier 33, amplifier 37 has applied to it only the sum of the input currents in resistors 35 and 34. During the negative-going portion of the gate signal however, a negative current via resistor 36, larger than the peak of the positive current which is the sum of the currents through resistors 35 and 34, is applied to the input of amplifier 37. Thus when the gate signal is negative the output of amplifier 37 will be forced positive in spite of any signals transmitted via resistors 35 and 34. The feedback path of negative-gain, operational feedback amplifier 37 is again split into positive-current and negative-current paths, the former comprising diode 42 and resistor 39, and the latter comprising diode 40 and resistor 38. Thus when the negative portion of the gate signal drives the output of amplifier 37 positive, there will be no output potential apparent at the junction of diode 40 and resistor 38, which transmits merely the negative feedback current. Only when the gate signal goes positive will the output of the amplifier 37 be negative, in response to the positive sum of currents through input resistors 35 and 34. In these circumstances, specifically between the angles $A_1$ and $A_2$, and between the angles $A_3$ and $A_4$, the output of the amplifier 37 will appear at the junction of diode 40 and resistor 38. The gating action so achieved results in a precision gate, since when the output is gated to appear at the aforementioned junction of diode 40 and resistor 38, its accuracy is limited only by the values of passive resistors 35, 34 and 38, and the performance of the high-gain feedback amplifier 37.

The output at the junction of diode 40 and resistor 38 is applied to filtering means such as high-gain inverting amplifier 45 via input resistor 44, the amplifier being also provided with feedback resistor 46 and feedback capacitor 47. The high amplifier gain assures accurate computation, and the feedback capacitor providing the filtering action required to eliminate ripple components and to yield an essentially pure DC output signal at terminal 7. This output signal represents the gated average on a full-wave basis of and is proportional to the input signal applied to terminal 2. The gating action is taken between such angles as to provide the degree of rejection selected by design, for one or more odd harmonic components of 0° phase relationship with respect to the fundamental, as hereinbefore described.

While preferred embodiments of the invention are illustrated in the drawings and have been described herein, modifications which do not depart from the essence of the invention may be made and, indeed, are apparent to those knowledgeable in electronic circuitry. Therefore, it is intended that the invention not be limited by the precise structures which are illustrated, but rather that the scope of the invention be construed in accordance with the appended claims.

I claim:

1. A system for converting a periodic, complex electrical input wave to a DC signal, and comprising in combination:
    absoluting means for providing an output signal which is a function of the instantaneous absolute value of said input wave;
    means for comparing said absolute value with a DC value proportional to the output of said system for generating explicit time-gating signals when said absolute value exceeds the value of said DC signal;
    means for averaging the output from said absoluting means during a time interval established by said gating signals; and
    means for filtering out ripple in the output of said means for averaging so as to provide said DC signal as the output of said system.

2. A system as defined in claim 1 wherein a first pair of said gating signals are generated during a first half-cycle of the fundamental of said wave and are symmetrically disposed about the angle of 90°, a second pair of said gating signals occurring during a second half-cycle of said fundamental being disposed symmetrically about the angle of 270°.

3. A system as defined in claim 2 wherein said first pair of signals occur at angles of substantially 30 and 150°, and said second pair occur at angles of substantially 210 and 330°.

4. A system as defined in claim 2 wherein said first pair of signals occur at angles of substantially 18 and 162° and said second pair occur at angles of substantially 198 and 342°.

5. A system as defined in claim 2 wherein said first pair of signals occur at angles of substantially 24.1 and 155.9°, and said second pair of angles occurs at substantially 204.1 and 335.9°.

6. A system as defined in claim 1 in which said absoluting means comprises a high-gain amplifier having a pair of feedback paths, a first diode in one of said feedback paths arranged to permit current flow only during the positive excursion of an input signal to said amplifier, a second diode in the other of said feedback paths arranged to permit current flow only during the negative excursion of said input signal, a load impedance in each of said feedback paths, and means for deriving said output signal from across at least one of said load impedances.

7. A system as defined in claim 1 in which the said means for comparing comprises a high-gain amplifier having a pair of feedback paths, a first diode in one of said feedback paths arranged to permit current flow only during the positive excursion of the input signal to said amplifier, a second diode in the other of said feedback paths arranged to permit current flow only during the negative excursion of said input signal, a load impedance in each of said feedback paths, means for deriving said gating signals from the output of said amplifier, a first input impedance connecting the output of said system to the input of said amplifier and a second input impedance connecting the output of said absoluting means to the input of said amplifier.

8. A system as defined in claim 1 in which said means for averaging comprises a high-gain amplifier having a pair of feedback paths, a first diode in one of said feedback paths arranged to permit current flow only during the positive excursion of the input signal to said amplifier, a second diode in the other of said feedback paths arranged to permit current flow only during the negative excursion of said input signal, a load impedance in each of said feedback paths, means for deriving an output signal from across a first said load impedance of one of said feedback paths, a first input resistive coupling means for connecting the input of said amplifier to the output of said absoluting means, a second input resistive coupling means for connecting the input of said amplifier to the output of said means for comparing, said means for comparing providing gating signals alternating between zero and a nonzero value exceeding in magnitude the sum of the other input signals to said amplifier so that when said gating signal is zero the output signal from said amplifier represents the weighted sum of the said input signals, and when said gating signal in nonzero it drives the output of said high-gain amplifier so that the output signal derived from across said first load impedance is zero during the time that the said input gating signal is nonzero.